(12) United States Patent
Ljung

(10) Patent No.: US 6,529,739 B1
(45) Date of Patent: Mar. 4, 2003

(54) METHOD AND APPARATUS IN A CELLULAR NETWORK

(75) Inventor: Petter Ljung, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/277,607

(22) Filed: Mar. 29, 1999

(30) Foreign Application Priority Data

Mar. 30, 1998 (SE) ............................................. 9801096

(51) Int. Cl.⁷ .............................. H04Q 7/30; H04Q 7/34
(52) U.S. Cl. ...................... 455/517; 455/523; 455/453; 455/450
(58) Field of Search .................................. 455/523, 67.1, 455/67.3, 403, 453, 550, 422, 15, 16, 517, 450, 451, 452, 10, 509

(56) References Cited

U.S. PATENT DOCUMENTS

| | | | |
|---|---|---|---|
| 5,134,709 A | 7/1992 | Bi et al. ..................... | 455/67.1 |
| 5,343,463 A | 8/1994 | van Tetering et al. ...... | 455/67.1 |
| 5,377,327 A | 12/1994 | Jain et al. .................. | 455/67.1 |
| 5,408,465 A | 4/1995 | Gusella et al. ............. | 455/67.1 |
| 5,504,754 A | 4/1996 | Grüenfelder ............... | 455/67.1 |
| 5,596,570 A * | 1/1997 | Soliman ..................... | 455/67.3 |
| 5,608,719 A | 3/1997 | Hyodo et al. .............. | 455/67.1 |
| 5,850,596 A * | 12/1998 | Reynolds ..................... | 455/63 |

FOREIGN PATENT DOCUMENTS

| | | |
|---|---|---|
| DE | 297 03 948 | 6/1997 |
| EP | 0 762 668 | 3/1997 |
| WO | 90/15489 | 12/1990 |

\* cited by examiner

*Primary Examiner*—William Trost
*Assistant Examiner*—Keith Ferguson

(57) ABSTRACT

A method of controlling the traffic load in a telecommunications system, in which the communication between terminals and the network takes place through an air interface, includes determining a dummy traffic load that is to be generated, and generating the dummy traffic load in the network. An apparatus for controlling the traffic load in a telecommunications network is also disclosed, including a device for determining the dummy traffic load to be generated, and a device for generating the dummy traffic load. The traffic load to be generated may be determined on the basis of the current traffic load, for example, to keep the total traffic load at a constant level or to add dummy traffic load to the ordinary traffic load in dependence on the current ordinary traffic load.

3 Claims, 1 Drawing Sheet

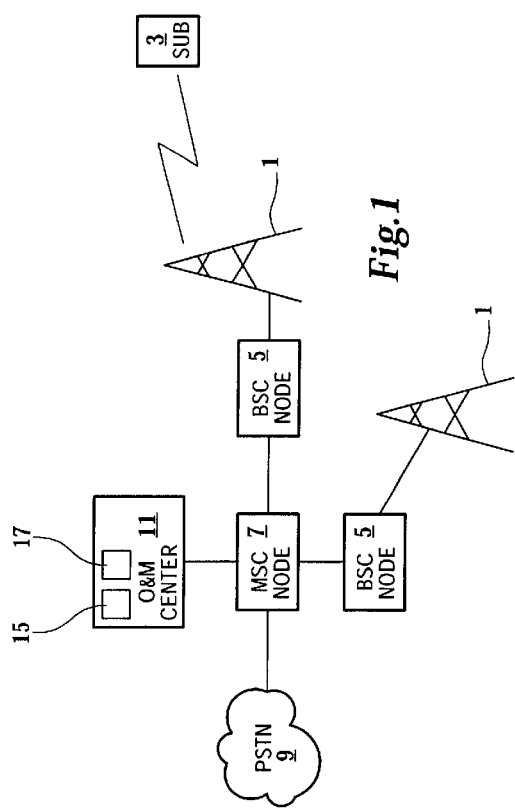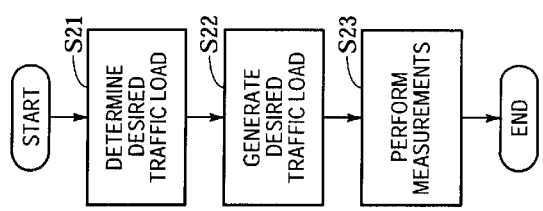

METHOD AND APPARATUS IN A CELLULAR NETWORK

This application claims priority under 35 U.S.C. §§119 and/or 365 to 9801096-0 filed in Sweden on Mar. 30, 1998; the entire content of which is hereby incorporated by reference.

BACKGROUND

The present invention relates to the testing of cellular networks, and in particular to controlling the load in cellular networks for test purposes.

The performance in a mobile telephone network is highly dependent on the traffic load of the system. A high traffic load leads to interference in the system, reducing the performance of the system. In a cellular system, in which signals are received and transmitted through the air interface, it is impossible to control the traffic load, that is, the number of people calling and the location of the mobile terminals.

The optimization of a mobile network is usually done by trying different parameter settings. This may involve the testing of several hundred parameters. The parameter setting that generated the best result in terms of dropped calls, handover performance etc. is then used. Often, the traffic load changes from test case to test case and it is often difficult to determine if a change in performance was caused by the new test case or by fluctuations in traffic load. This means that the parameters are set according to a combination of test results and guesswork.

When increasing the number of subscribers in a network it is necessary to decide on a maximum load in the network. There is no way today of determining the maximum load that can be handled by a network, that is, the maximum number of subscribers that can be accepted in a given network, or when it is necessary to increase the capacity of the network.

SUMMARY OF THE INVENTION

It is an object of the present invention to enable the control of the traffic load and thereby the interference in a cellular network.

It is another object of the present invention to provide a method and an apparatus that will enable the traffic load to be kept constant in a network, for example, for test purposes.

It is yet another object of the present invention to enable reliable measurements of network performance.

It is still another object of the present invention to provide a method and an apparatus that will enable the creation of heavy loads in the air interface in a mobile telecommunications network.

These objects are achieved by a method of controlling the traffic load in a telecommunications system in which the communication between terminals and the network takes place through an air interface, comprising the following steps:

determining an interference, that is, to be generated,
generating said interference in the network.

Preferably, the interference is generated by generating a traffic load in the air interface. The traffic load to be generated may be determined on the basis of the current traffic load or to keep the total traffic load at a constant level. Dummy traffic load may be added to the ordinary traffic load in dependence of the current ordinary traffic load.

The output power and/or the utilization of Downlink Discontinuous Transmission (DTX) of the generated dummy traffic may be controlled, for example, in dependence of the output power and DTX utilization of an occupied traffic channel.

An apparatus for carrying out the method is also disclosed, comprising means for determining an interference to be generated,
means for generating said interference.

The apparatus may also comprise means for controlling the power and/or the utilization of DTX of the dummy traffic generated.

Creating a dummy traffic load means occupying one or more channels by transmitting useless information ("dummy bursts") in these channels, that is, information that is neither payload nor control information.

The amount of dummy traffic to be generated may be determined in different ways:

The total load (dummy traffic and ordinary traffic together) may be kept at a constant level.
An amount of dummy traffic may be added in dependence of the amount of ordinary traffic, for example, a certain percentage may be added.
A constant amount of dummy traffic may be added.

The invention offers the following advantages:

The possibility to create a work load enables the performance of tests requiring high loads in low traffic areas or at times when the traffic load is low, such as the night time.
The possibility to keep the load in a system constant makes the tests and measurements performed in the systems more reliable.
The traffic generator enables network operators to predict the performance of the network for a given number of subscribers.

BRIEF DESCRIPTION OF THE DRAWINGS

FIG. 1 illustrates a cellular telecommunications network comprising a load generating means according to the invention.

FIG. 2 is a work flow of the actions taken to carry out the method according to the invention.

FIG. 3 shows the allocation of dummy traffic channels according to a preferred embodiment of the invention.

DETAILED DESCRIPTION OF EMBODIMENTS

FIG. 1 is an example of a cellular network comprising load generating means according to the invention. The network comprises a number of base stations 1 to which subscribers 3 can connect through the air interface. The base stations are connected to base station controller (BSC) nodes 5 performing basic functions such as resource allocation. The BSC nodes 5 are connected to a mobile switching (MSC) node 7 which carries out switching functions in the cellular network. The MSC node 7 is usually connected to another network, such as the Public Services Telephone Network (PSTN) 9. The MSC node 7 and BSC nodes 5 are also connected to an Operation and Maintenance (O&M) centre 11, from which the O&M functions in the system are carried out.

According to the invention, the O&M centre comprises a traffic load generating means 15 for generating an increased interference in the form of a dummy traffic load to be transmitted through the air interface, thereby generating an increased interference in the air interface. In many situations, the amount of dummy load to be generated depends on the traffic in the network at a given time. This information is always available in the network.

In a preferred embodiment of the invention, the traffic load generating means 15 generates traffic load by ordering the base station 1 or the BSC 5 to transmit dummy bursts on a number of idle channels.

According to a preferred embodiment the O&M centre also comprises a control means 17 for adjusting the output power and the Downlink Discontinuous Transmission DTX of the dummy cells, as will be discussed in more detail below. Normally, the control means 17 instructs the base station 1 or the BSC 5 which then carries out the adjustment according to the instructions.

Of course, the load generating means 15 and the control means 17 do not have to be located in an O&M centre but may be located at any convenient place in the network. They also do not have to be located in the same node.

As will be understood, the network shown in FIG. 1 is only an example of a cellular network. The functionality may be implemented, and shared between different nodes, in a number of ways known in the art.

FIG. 2 is a flow chart of the method according to the invention.

Step S1: Determine the desired traffic load. For example, the traffic load may be kept at a constant level, a constant amount of dummy traffic may be added to the traffic load, or the amount of dummy traffic may be determined on the basis of the current traffic load.

Step S2: Generate the desired traffic load.

Step S3: Perform measurements as desired.

If the operator wants to test the behaviour of the system if the number of subscribers is increased by, for example, 25%, this may be tested by adding, at all times, 25% to the current traffic load in each cell.

In a Time Division Multiple Access (TDMA) system, the information is carried in frames comprising a number of time slots. The same time slot, for example the third time slot in a number of consecutive frames is referred to as a physical channel. Typically, one connection occupies one physical channel, but a connection may also occupy several physical channels. Several connections may also share one physical channel.

For example, in a Global System for Mobile Communications (GSM), generating dummy traffic means transmitting dummy bursts on idle channels. How many channels, and which ones, to occupy may be selected in different ways. The power level of most of the channels transmitted by a base station varies in dependence of the distance between the base station and the mobile terminal participating in the connection. Also, in ordinary connections Downlink Discontinuous Transmission (DTX) is often used, implying that the transmission rate of the BTS is reduced when there is no information to be transmitted.

According to a preferred embodiment the dummy traffic has the same variation in power level and the same utilization of DTX as the ordinary traffic. According to a preferred embodiment of the invention, this is achieved in that each channel used to carry dummy load is associated with a connection carrying ordinary traffic. The dummy connection can then follow power level and the DTX utilization used for the real connection. For example, in a TDMA system, a channel carrying dummy load may always be inserted next to an occupied traffic channel. The transmission on a channel carrying dummy load always has the same DTX and the same output power as the traffic channel with which it is associated.

FIG. 3 shows an example in which each connection carrying dummy traffic is associated with an ordinary connection. The table shows the eight time slots TS1–TS8 of each of four frequencies f1–f4. The power of each ordinary connection is shown in bold, in terms of dB down regulation, whereas the dummy connections are shown in normal text. The first frequency f1 is the frequency carrying the broadcast control channel in a TDMA system. This channel always transmits on full power, denoted FP. On this frequency no dummy traffic is generated. On the second frequency f2, time slots TS1, TS3 and TS6 carry ordinary connections. On the third frequency f3, time slot TS3 carries an ordinary connection. On the fourth frequency f4, the first TS1 and the sixth TS6 time slot carry ordinary connections. A total of six ordinary connections are transmitted on the three frequencies f2, f3, f4. In this example dummy traffic has been generated to increase the total amount of traffic by 67%. This means that four dummy connections are generated, in time slots TS2 and TS4 of the second frequency f2, time slot TS4 of the third frequency f3 and in time slot TS2 of the fourth frequency f4. As shown in the table, each dummy connection is generated in a time slot following an ordinary connection, and the power level of each of the dummy connection is the same as the power level of the ordinary connection that it follows. The DTX of each dummy connection also follows the DTX of the associated ordinary connection, although this is not shown in the figure.

The example above is related to GSM; however, the principle of transmitting dummy load in order to emulate a certain traffic load on the downlink can be applied in any mobile communications system. Also, the principle of associating dummy channels with ordinary channels in order to emulate the same variation in power level and the same utilization of DTX can be applied in any mobile communications system.

Note that the dummy load should only be transmitted in cases where the real traffic to which it is associated creates additional interference. For example, in GSM, this means that no dummy load should be transmitted on channels transmitted on the frequency to which the BCCH is allocated.

According to another embodiment of the invention, a predefined pattern is used for the output power and the DTX of the channels carrying dummy load. Of course, different patterns may be used for different dummy channels.

In the above description, only downlink transmission of dummy loads has been discussed. It would of course be possible to generate dummy traffic in the uplink direction, but it would be far more difficult to emulate a normal situation. Ideally, the dummy traffic generators would have to move around in the same way that mobile terminals do. In GSM systems that are limited by interference, the critical link is usually the downlink. Thus, in order to emulate a situation with additional (or constant) load in the system, dummy load only has to be created on the downlink.

What is claimed is:

1. A method of controlling the traffic load in a cellular telecommunications system in which remote terminals and a network communicate through an air interface, comprising:
    determining an interference that is to be generated;
    generating the interference in the air interface, such that the interference is generated in addition to ordinary traffic in the air interface and wherein the interference is generated by generating a dummy traffic load; and
    controlling utilization of discontinuous transmission of the generated dummy traffic.

2. A method of controlling the traffic load in a cellular telecommunications system in which remote terminals and a network communicate through an air interface, comprising:

determining an interference that is to be generated;

generating the interference in the air interface, such that the interference is generated in addition to ordinary traffic in the air interface and wherein the interference is generated by generating a dummy traffic load; and controlling discontinuous transmission on each channel carrying dummy load in dependence on discontinuous transmission on an occupied traffic channel.

3. An apparatus for controlling traffic load in a cellular telecommunications network, comprising:

means for determining an interference load to be generated;

means for generating the interference in the air interface, such that the interference is generated in addition to ordinary traffic in the air interface, and wherein the interference is generated by generating a dummy traffic load; and means for controlling utilization of discontinuous transmission of the dummy traffic load generated.

* * * * *